United States Patent
Ricco et al.

(10) Patent No.: US 7,182,067 B2
(45) Date of Patent: Feb. 27, 2007

(54) STORAGE-VOLUME FUEL INJECTION SYSTEM FOR AN INTERNAL COMBUSTION ENGINE

(75) Inventors: Mario Ricco, Valenzano (IT); Sisto Luigi De Matthaeis, Valenzano (IT); Annunziata Anna Satriano, Valenzano (IT); Raffaele Ricco, Valenzano (IT)

(73) Assignee: C.R.F. Società Consortile per Azioni (IT)

( * ) Notice: Subject to any disclaimer, the term of this patent is extended or adjusted under 35 U.S.C. 154(b) by 0 days.

(21) Appl. No.: 11/110,300

(22) Filed: Apr. 20, 2005

(65) Prior Publication Data

US 2006/0000446 A1    Jan. 5, 2006

(30) Foreign Application Priority Data

Jun. 30, 2004    (EP) .................................. 04425478

(51) Int. Cl.
*F02M 37/04*    (2006.01)

(52) U.S. Cl. ..................... 123/446; 123/300; 123/456; 417/505

(58) Field of Classification Search ................ 123/456, 123/446, 458, 467, 506, 447, 514, 299, 300; 417/505, 440, 499, 297, 494, 302, 493, 303, 417/502
See application file for complete search history.

(56) References Cited

U.S. PATENT DOCUMENTS

| | | | | |
|---|---|---|---|---|
| 4,426,198 A | * | 1/1984 | Bastenhof et al. | 417/494 |
| 4,489,684 A | * | 12/1984 | Yamada | 123/198 F |
| 5,230,613 A | * | 7/1993 | Hilsbos et al. | 417/439 |
| 5,676,114 A | * | 10/1997 | Tarr et al. | 123/446 |
| 5,678,521 A | | 10/1997 | Thompson et al. | 123/447 |
| 6,095,118 A | * | 8/2000 | Klinger et al. | 123/446 |
| 6,314,945 B1 | * | 11/2001 | Sugiyama et al. | 123/506 |
| 6,325,051 B1 | * | 12/2001 | Oomori et al. | 123/516 |
| 6,453,874 B1 | * | 9/2002 | Duffy et al. | 123/446 |
| 6,651,630 B2 | * | 11/2003 | Hiraku et al. | 123/506 |
| 6,668,800 B2 | * | 12/2003 | Ricco et al. | 123/446 |
| 6,705,277 B1 | * | 3/2004 | McGee | 123/299 |
| 6,823,844 B2 | * | 11/2004 | Steinbrenner et al. | 123/446 |
| 6,901,912 B1 | * | 6/2005 | Onishi et al. | 123/456 |
| 2001/0015200 A1 | * | 8/2001 | Mori | 123/495 |
| 2002/0078928 A1 | | 6/2002 | Onishi et al. | 123/458 |

(Continued)

FOREIGN PATENT DOCUMENTS

EP    0243871 A2    11/1987

(Continued)

OTHER PUBLICATIONS

European Search Report for EP 04 42 5478 (Jan. 11, 2005).

*Primary Examiner*—Carl S. Miller
(74) *Attorney, Agent, or Firm*—Howrey LLP

(57) ABSTRACT

The injection system (1) includes a pump (7) for supplying high-pressure fuel to a storage volume, defined for example by a common rail (6), for supplying a number of injectors (5). The pump (7) has at least one reciprocating pumping member (18) with a sinusoidal compression stroke (24). The injection system (1) includes at least one bypass solenoid valve (14) controlled by a control unit (16) having a chopper unit (28) for producing multiple deliveries (29, 31) at each compression stroke (24), so that the pressure in the common rail (6) is substantially level. Each pumping member (18) may be associated with a corresponding bypass solenoid valve (14).

27 Claims, 6 Drawing Sheets

U.S. PATENT DOCUMENTS

2002/0096145 A1* 7/2002 Ricco et al. .................. 123/446
2003/0127082 A1  7/2003 Takahashi ..................... 123/704

FOREIGN PATENT DOCUMENTS

| EP | 0375944 | A2 | 7/1990 |
| EP | 0802322 | A1 | 10/1997 |
| EP | 1369573 | A2 | 12/2003 |
| EP | 1382827 | A2 | 1/2004 |
| EP | 1387079 | A1 | 2/2004 |

* cited by examiner

STORAGE-VOLUME FUEL INJECTION SYSTEM FOR AN INTERNAL COMBUSTION ENGINE

BACKGROUND OF THE INVENTION

1. Field of the Invention

The present invention relates to a storage-volume fuel injection system for an internal combustion engine.

2. Technical Background

Fuel injection systems of modern internal combustion engines normally comprise a pump for supplying high-pressure fuel to a common rail having a given fuel storage volume and for supplying a number of injectors associated with the engine cylinders. The pump comprises at least one reciprocating pumping member, which, each time, performs an intake stroke and a compression or delivery stroke.

As is known, to be atomized properly, the fuel must be brought to extremely high pressure, e.g. of about 1600 bars in maximum-load conditions. Recent standards governing the pollutant content of engine exhaust gas require that the fuel feed pressure to the injectors be reproducible as accurately as possible, with respect to the electronic central control unit map, in "cylinder-cylinder" mode and "injection-injection" mode into the same cylinder, particularly in low/medium load conditions, which are the most important in evaluating the pollutant content of exhaust gas. Fluctuations with respect to the set pressure in the common rail can be limited, if the volume of the common rail is over one hundred times the quantity of fuel drawn by each injector at each combustion cycle. Such a common rail, however, is normally extremely bulky and therefore difficult to install on the engine.

To control the pressure in the common rail as mapped in the central control unit, injection systems have been proposed comprising a bypass solenoid valve fitted to the delivery line between the pump and the common rail, and which is controlled by an electronic unit on the basis of various engine operating parameters. Another proposal is to operate the pumping member by means of a cam synchronized with operation of each injector.

These known systems have the drawback of keeping the pump operating permanently at maximum flow, since the bypass solenoid valve provides simply for draining into the tank the fuel pumped in excess of that drawn by the injectors, thus dissipating thermal energy.

As is known, when the engine is started, the fuel, before it is ignited, must be brought to a minimum pressure sufficient to ensure reasonable atomization of the fuel injected at this stage. The size of the storage volume, however, does not allow an acceptable reduction in start-up time, so that fuel is injected at less than optimum pressure, thus resulting in poor combustion at the initial engine operating stage.

This practice has the drawback of failing to conform with recent pollution standards, which, in evaluating the pollutant content of exhaust gas, also take into account those emitted at the initial engine operating stage. To conform with current standards, it is therefore essential that the fuel also be brought to the right pressure at the initial operating stage of the engine.

Finally, a high-pressure pump is known featuring two side by side pumping members, each having an intake and compression chamber, and in which a bypass valve is located between the two chambers of the two cylinders, and is operated to drain into the chamber of one cylinder the surplus fuel pumped by the other cylinder.

This pump has the drawback of communication between the two compression chambers, one at high and the other at low pressure, possibly resulting in cavitation, thus reducing fill of the compression chamber and so impairing volumetric efficiency. To limit the drawback, additional pre-feed pumps with very high operating pressures, of around 20 bars, must be used, thus posing problems in terms of the working life of the pre-feed pump.

SUMMARY OF THE INVENTION

It is an object of the present invention to provide a fuel injection system, which is highly reliable and eliminates the drawbacks of known systems by optimizing performance and minimizing fuel consumption and pollutant emissions.

According to the present invention, there is provided a fuel injection system for an internal combustion engine having a number of cylinders, the system comprising a pump for supplying high-pressure fuel to a storage volume, a number of injectors supplied by said storage volume to inject said high-pressure fuel into corresponding cylinders of the engine at a corresponding injection cycle, said pump comprising at least one reciprocating pumping member with a compression stroke, and control means for controlling the pressure of the fuel supplied by the pump to the storage volume; characterized in that said control means comprise at least one bypass solenoid valve controlled by a chopper unit to generate at least multiple deliveries for a compression stroke of said pumping member.

More specifically, the high-pressure pump has a high instantaneous flow. And the chopper unit is controlled by an electronic control unit to pulse-width-modulation control said solenoid valve as a function of operating conditions of the engine, so that each delivery of the pump is limited to a variable portion of the compression stroke.

The invention also relates to a high-pressure pump for feeding fuel to a storage volume for supplying a number of fuel injectors, said pump comprising at least one reciprocating pumping member with a compression stroke; said pumping member having a compression chamber communicating with a delivery line, and being integrated with a corresponding bypass solenoid valve located at the compression chamber.

The invention also relates to a method of controlling the fuel pressure in a storage volume for at least one fuel injector of an internal combustion engine, wherein said fuel is supplied to said storage volume by at least one reciprocating pumping member with a compression stroke; said pumping member having a bypass solenoid valve; the method being characterized by comprising the steps of:

defining an optimum pressure value of the fuel in said storage volume as a function of operating conditions of the engine;

operating said bypass solenoid valve to generate multiple deliveries for a compression stroke of said pumping member; and controlling the duration of each of said deliveries, to keep said pressure of the fuel in said storage volume substantially constant during operation of said injector.

The storage volume may advantageously supply a number of injectors.

BRIEF DESCRIPTION OF THE DRAWINGS

A number of preferred, non-limiting embodiments of the invention will be described by way of example with reference to the accompanying drawings, in which.

DETAILED DESCRIPTION OF THE INVENTION

Figure 1:
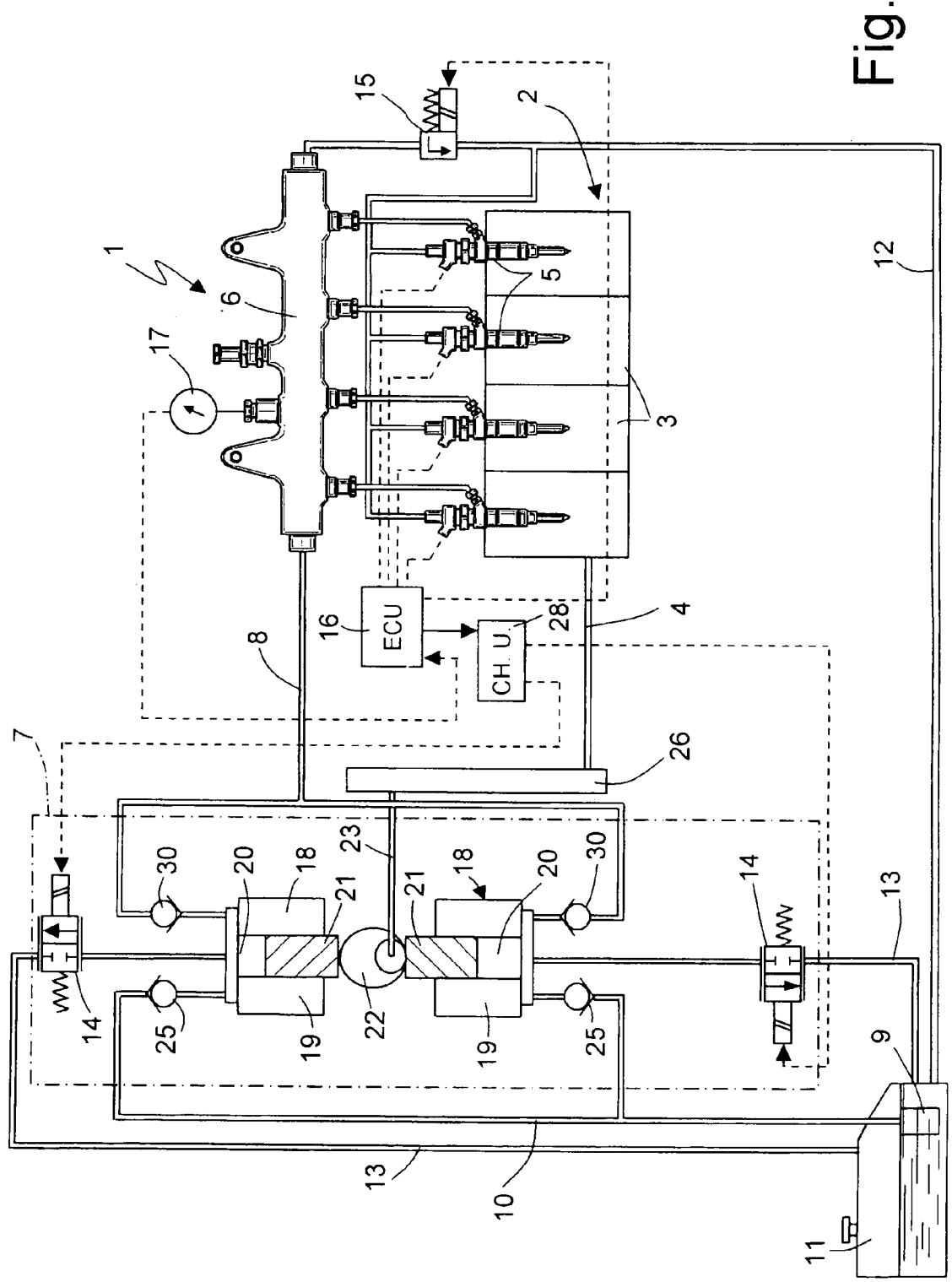
FIG. 1 shows a diagram of a common rail fuel injection system, in accordance with a first embodiment of the invention.

With reference to FIG. 1, number 1 indicates as a whole a common rail fuel injection system for an internal combustion, e.g. diesel, engine 2. Engine 2 comprises a number of, e.g. four, cylinders 3 which cooperate with corresponding pistons (not shown) to rotate a drive shaft 4.

Injection system 1 comprises a number of electric injectors 5 associated with, and for injecting high-pressure fuel into, cylinders 3. Injectors 5 are connected to a storage volume having a given volume for one or more injectors. In the embodiment shown, the storage volume is defined by a common rail 6, to which injectors 5 are all connected. Common rail 6 is supplied with high-pressure fuel by a high-pressure pump—indicated as a whole by 7—along a high-pressure delivery line 8. High-pressure pump 7 is in turn supplied by a low-pressure pump, e.g. a motor-driven pump 9, along a low-pressure-fuel intake line 10. Motor-driven pump 9 is normally located in the fuel tank 11, in which terminates a drain line 12 for the surplus fuel of injection system 1. Tank 11 is fed by drain line 12 with both the fuel drainage from injectors 5 and any surplus fuel in common rail 6 with respect to the pressure defined by a regulating solenoid valve 15.

To control the fuel pressure in common rail 6, control means for controlling the delivery of pump 7 are provided between high-pressure pump 7 and tank 11, and which comprise at least one bypass solenoid valve 14 for feeding any surplus fuel into tank 11 along corresponding drain lines 13 to maintain the required pressure in common rail 6.

The fuel in tank 11 is at atmospheric pressure. In actual use, motor-driven pump 9 compresses the low-pressure fuel, e.g. at around 2–3 bars; high-pressure pump 7 in turn compresses the fuel from intake line 10 to feed high-pressure fuel, e.g. at around 1600 bars, along high-pressure line 8 to common rail 6; and each injector 5 injects a fuel quantity, varying between a minimum and maximum value, into corresponding cylinder 3, under the control of an electronic control unit 16 which may be defined by an ordinary microprocessor central control unit of engine 2.

Control unit 16 is supplied with signals indicating operating conditions of engine 2, such as the accelerator pedal position and the speed of drive shaft 4, which are determined by corresponding sensors, and the fuel pressure in common rail 6, which is determined by a pressure sensor 17. By processing the incoming signals in an appropriate program, control unit 16 controls when and for how long individual injectors 5 are operated, and also controls regulating solenoid valve 15.

High-pressure pump 7 comprises one or more reciprocating pumping members 18, each defined by a cylinder 19 having a compression chamber 20 in which slides a piston 21. Compression chamber 20 communicates with intake line 10 via an intake valve 25, and with delivery line 8 via a delivery valve 30.

Piston 21 is operated by cam means 22 fitted to a control shaft 23 of pump 7, and which operate piston 21 in a sinusoidal reciprocating movement comprising an intake stroke and a compression or delivery stroke, as explained in detail later on. In the FIG. 6–9 graphs, the compression stroke of each pumping member 18 is shown by line 24, which therefore also shows the flow of pumping member 18 in the absence of bypass solenoid valve 14.

In the example shown, shaft 23 of pump 7 is connected to drive shaft 4 by a transmission device 26 to command a compression stroke 24 for each injection by injectors 5 into respective cylinders 3. In four-stroke engine 2, therefore, the speed of pump 7 equals half the speed of the engine (0.5 transmission ratio).

Control shaft 23 may be defined by a shaft also designed to operate other devices on the engine, and, in the case of a four-stroke engine, may advantageously be defined by an ordinary camshaft controlling the intake and exhaust valves of cylinders 3 of engine 2, so that the ratio between the speed of shaft 23 and that of drive shaft 4 is constant. Alternatively, shaft 23 may be operated at a speed independent of that of drive shaft 4.

In engines with four or more cylinders, pump 7 normally comprises a number of pumping members 18 which may be operated by a common cam. More specifically, in the FIG. 1 embodiment, pump 7 comprises two diametrically opposite pumping members 18 operated by a common cam 22.

In modern four-stroke diesel engines, the injection cycle, indicated 27 in FIGS. 6–9, comprises a sequence of fuel injections variously metered as a function of the operating conditions of engine 2. The sequence comprises at least one main injection and one or more injections before and/or after the main injection. The sequence of these injections is therefore formed by a corresponding train of oscillations in the fuel pressure in common rail 6.

According to the invention, bypass solenoid valve 14 is integrated with pump 7 to reduce useless spaces and minimize the amount of fuel to be pumped. More specifically, each pumping member 18 is associated with a corresponding solenoid valve 14, which allows fuel flow from pump 7 to common rail 6 when closed, and feeds fuel from pump 7 back to tank 11 when open. Pump 7 preferably has a high instantaneous flow.

Control unit 16 controls solenoid valve 14 by means of a pulse-width-modulated (PWM) logic signal, and at a frequency related to the speed of pump 7. More specifically, the duration of the pulse as a function of the operating conditions of engine 2 is also modulated as a function of the instantaneous position and speed of piston 21 at a frequency equal to the number of desired deliveries multiplied by the frequency of the compression strokes of piston 21. Delivery by pump 7 is therefore limited to only a portion of compression stroke 24 of each pumping member 18, when bypass valve 14 is off or closed. Whereas, over the rest of compression stroke 24, bypass valve 14 being open, the compression chamber communicates with tank 11, so that fuel is simply fed back to tank 11, thus reducing the energy dissipation of pump 7. The actual delivery angle of each pumping member 18 is selected as a function of the operating conditions of the engine, i.e. the flow demanded by injectors 5.

To control bypass valve 14, the position and speed of piston 21 must therefore be known, and can be determined with a specific transmission ratio between pump shaft 23 and drive shaft 4. In the FIG. 1 example, a number of pumping members 18 equal to half the number of cylinders 3 of engine 2 give a transmission ratio of 0.5. Whereas, in the case of an engine 2 with four cylinders 3, and a pump 7 with three pumping members, the transmission ratio is 0.75.

Alternatively, the position and speed of each piston 21 may be determined by a travel/speed transducer of shaft 23 of pump 7.

Each bypass solenoid valve 14 is controlled by control unit 16 via a chopper unit 28, which, though shown separately in the drawings for the sake of clarity, is advantageously integrated with control unit 16 and therefore defined by corresponding software. Unit 28 produces at least two deliveries for each compression stroke 24 of pump 7, advantageously controls solenoid valve 14 to produce at least one delivery for an injection cycle 27 of injectors 5 of engine 2, and may even selectively produce a choppered delivery for only some of the compression strokes of pump 7. The pressure in common rail 6 is thus substantially level, i.e. varies little, so that common rail 6 can be designed smaller as compared with known rails.

Figure 6:
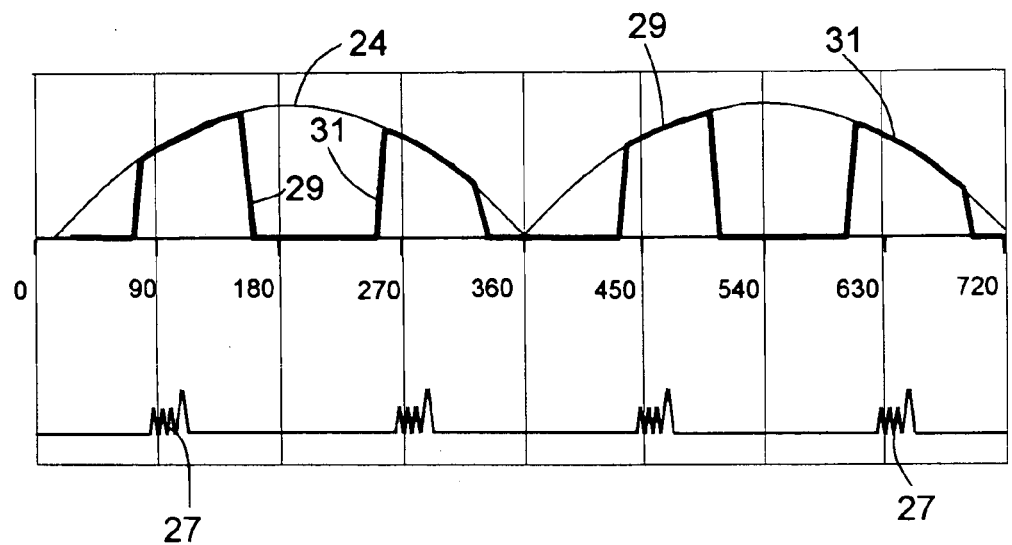
FIGS. 6 to 9 show operation graphs of the fuel injection system according to the invention.

In a first variation of the invention, shown in the FIG. 6 graph, chopper unit 28 commands two deliveries 29 and 31 for each compression stroke 24 of pump 7. The two curves 24 indicate two consecutive compression strokes 24 of pumping members 18. For each injection cycle 27 of injectors 5, pump 7 performs a corresponding fuel delivery 29, 31, thus immediately restoring the pressure in common rail 6. Deliveries 29, 31 of each compression stroke 24 may extend over a rotation angle of cam 22 varying from one pumping stroke to the other, depending on the amount of fuel injected by each injector 5.

Figure 8:
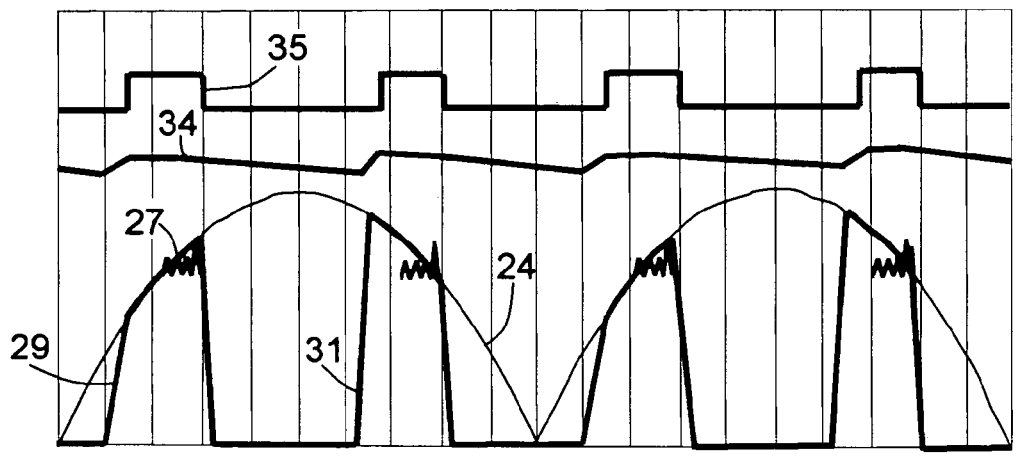

In FIG. 8, line 32 indicates the signal emitted by chopper unit 28 to control bypass solenoid valve 14; line 35 indicates the control unit 16 signal controlling injection cycles 27; line 33 indicates the variation in pressure on pumping member 18; and line 34 indicates the variation in pressure in common rail 6.

As shown clearly in FIG. 8, for each delivery 29, 31 of a pumping member 18, the pressure in relative compression chamber 20 first increases rapidly, then increases more slowly during injection cycle 27, and, finally, upon activation of solenoid valve 14, drops sharply to the intake pressure value. And as shown clearly by line 34, the pressure in common rail 6 increases prior to injection cycle 27, remains substantially constant during injection cycle 27, and falls slowly between the two consecutive injection cycles 27, due to inevitable fuel leakage of injection system 1.

Figure 9:
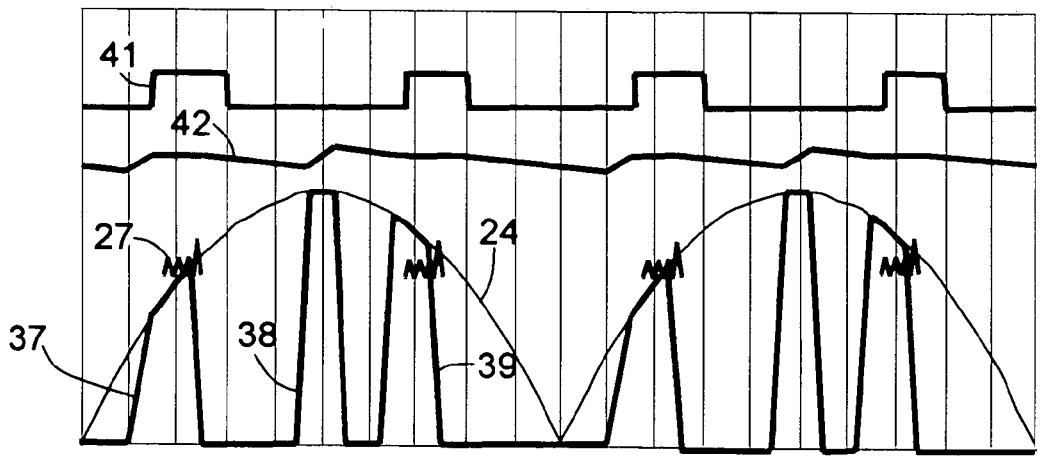

In another variation of the invention, shown in the FIG. 9 graph, chopper unit 28 controls three deliveries 37, 38, 39 for each compression stroke 24 of pump 7. Deliveries 37 and 39 are performed substantially at the two injection cycles 27, and delivery 38 is performed in the interval between deliveries 37 and 39 of compression stroke 24 of pumping member 18. In FIG. 9, line 41 indicates the injection control signal; and line 42 indicates the variation in fuel pressure in common rail 6, and shows how delivery 38 serves to restore the fuel pressure drop in common rail 6 caused by fuel leakage from the various component parts of injection system 1.

Figure 7:
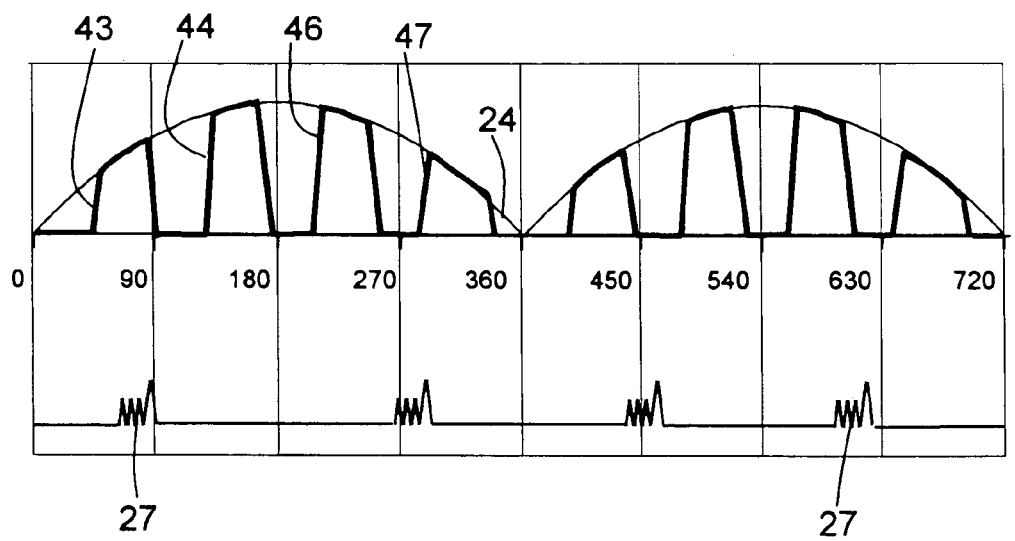

In another variation shown in the FIG. 7 graph, chopper unit 28 controls as many as four deliveries 43, 44, 46, 47 for each compression stroke 24, during which two injection cycles 27 into cylinders 3 of engine 2 are also performed. In this case, deliveries 43, 44, 46, 47 are synchronized with one another, but injection cycles 27 need not be synchronized with the deliveries of pump 7. As stated, bypass solenoid valve 14 is advantageously integrated with pump 7, i.e. adjacent to or facing compression chamber 20 of relative pumping member 18, so as to minimize the length of the line between bypass solenoid valve 14 and compression chamber 20. When excited, bypass solenoid valve 14 therefore only has to dispose of a minimum volume of pressurized fuel, and therefore responds quickly and may be of minimum size.

In the FIG. 1 embodiment, each of the two pumping members 18 is integrated with a corresponding bypass solenoid valve 14 located in compression chamber 20 of relative cylinder 19. In the FIG. 2 embodiment, pump 7 comprises two pumping members 18, as in the FIG. 1 embodiment, but each bypass solenoid valve 14 is integrated with the corresponding pumping member 18 and located along respective low-pressure line 10 of compression chamber 20. In which case, solenoid valve 14 also functions as an intake valve of the respective pumping member.

Figure 3:
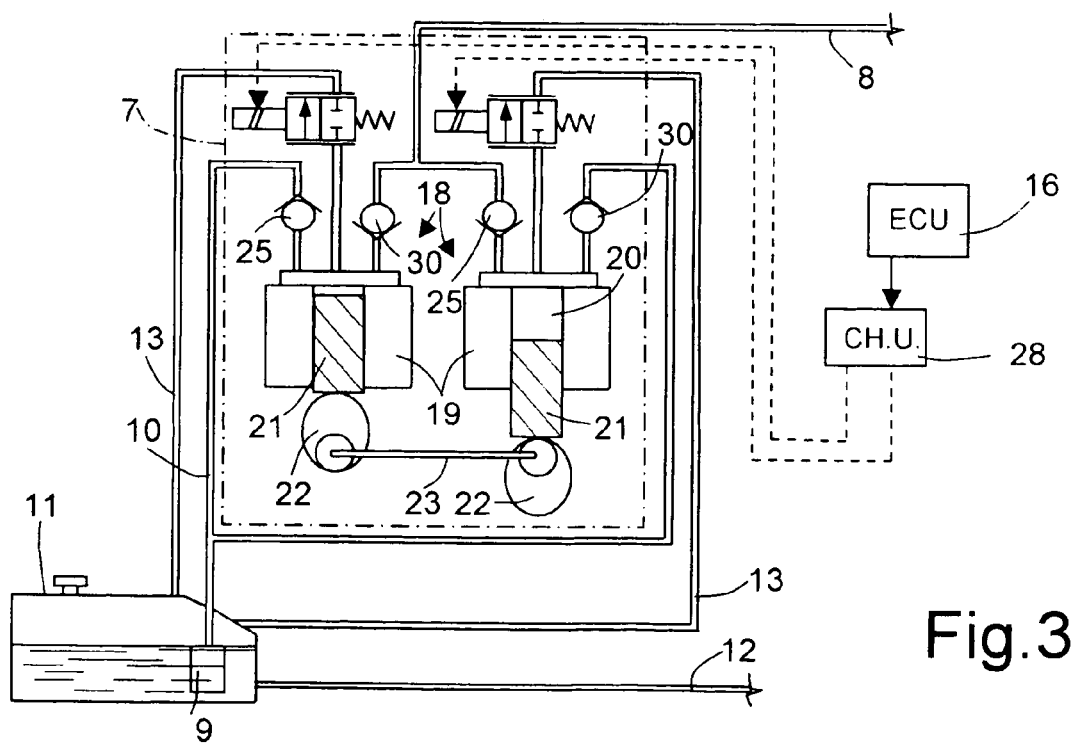

In the FIG. 3 embodiment, the two pumping members 18 are located side by side and operated by two cams 22 fitted to shaft 23 with a 180° phase displacement; and each of the two pumping members 18 is integrated with a bypass solenoid valve 14 located at relative compression chamber 20. The FIG. 3 embodiment, featuring a pump 7 with side by side pumping members 18, is even simpler to produce and more compact.

One aspect of the invention is represented by high-pressure pump 7 for feeding fuel to storage volume 6 supplying one or more fuel injectors 5. Pump 7 comprises at least one pumping member 18 integrated with the corresponding bypass solenoid valve 14 located at compression chamber 20 of pumping member 18. More specifically, bypass solenoid valve 14 is coaxial with pumping member 18, and, in the case of a pump 7 with two pumping members 18, pump 7 is integrated with two bypass solenoid valves 14, each coaxial with the corresponding pumping member 18. Pumping members 18 may be coaxial and opposite, as in FIGS. 1 and 2, in which they are activated by a common cam 22, or may be parallel, as in FIG. 3, in which they are activated by two coaxial cams 22.

Figure 4:
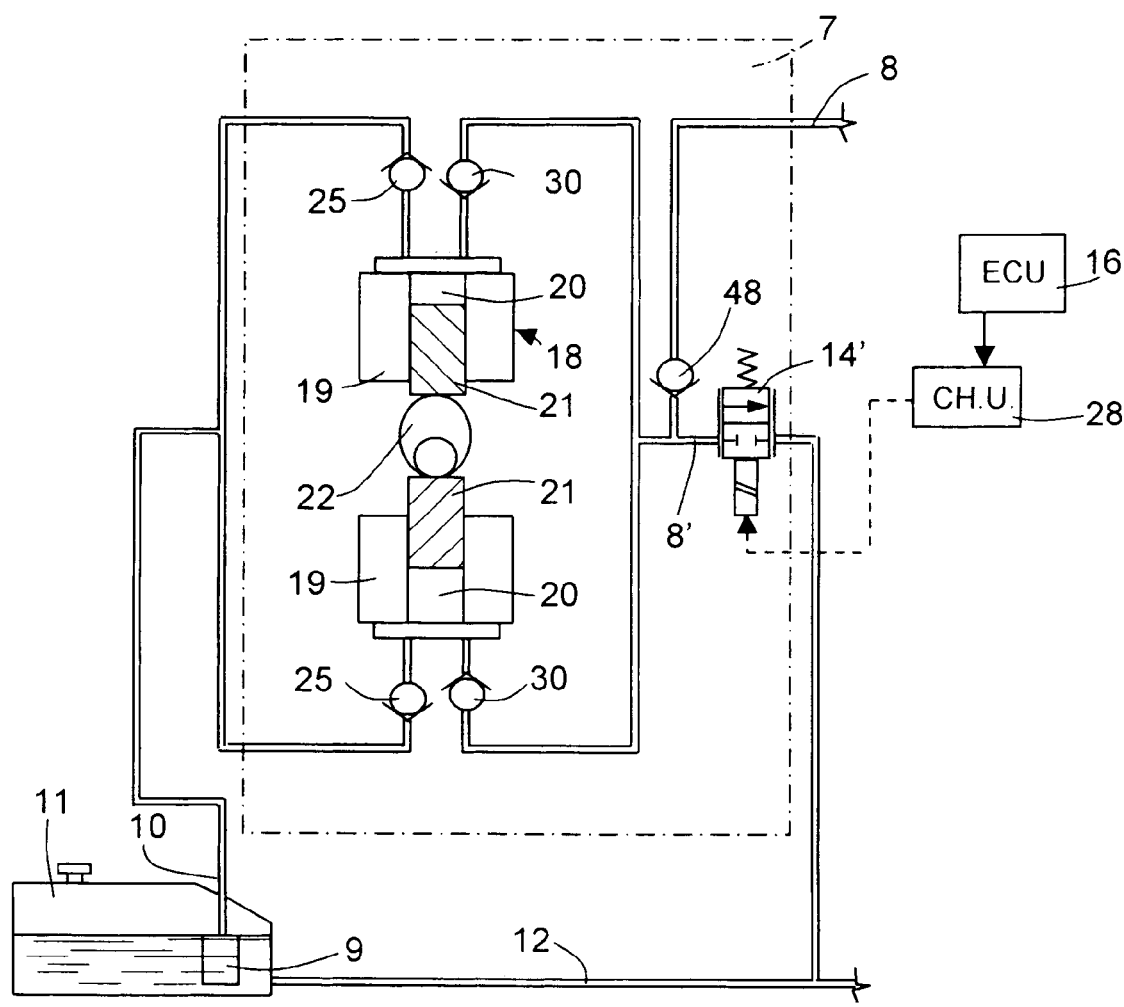

Instead of one bypass solenoid valve 14 for each pumping member 18, one bypass solenoid valve 14' may be provided for the whole of pump 7. In the FIG. 4–5 embodiments, one solenoid valve 14' is provided for both pumping members 18. More specifically, in the FIG. 4 embodiment, bypass solenoid valve 14' is located along a portion 8' of delivery line 8 common to both pumping members 18, which are opposite, as in the FIG. 1 embodiment; and bypass valve 14' is associated with a non-return valve 48 located along delivery line 8.

Figure 5:
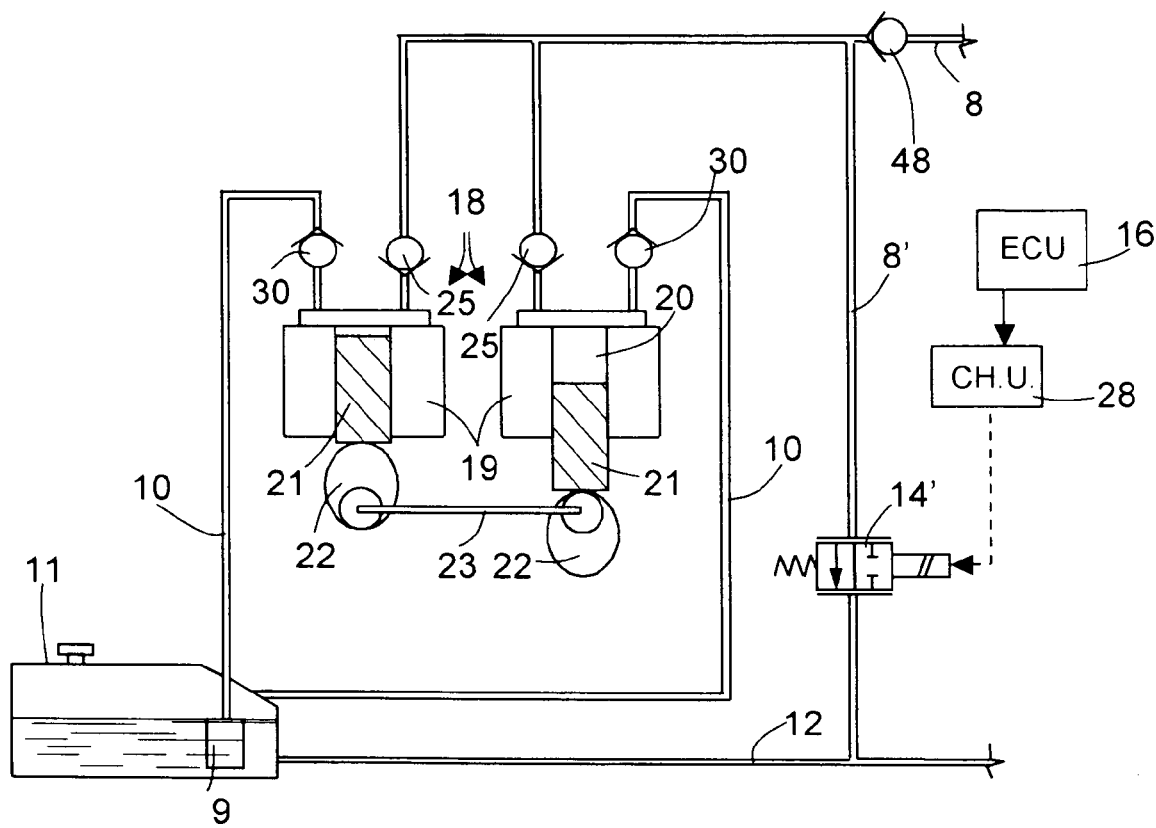

In the FIG. 5 embodiment, bypass solenoid valve 14' is located along a portion 8' of delivery line 8 common to both pumping members 18, which are parallel, as in the FIG. 3 embodiment; and bypass valve 14' is again associated with a non-return valve 48 located along delivery line 8.

As stated, when drive shaft 4 and control shaft 23 of pump 7 are synchronized, e.g. by means of mechanical transmission device 26, a definite correlation exists between the angular position of shaft 23 of pumping members 18 and the instant injection is commanded, and control unit 16 automatically controls chopper unit 28 as a function of the angular position of shaft 23 of pump 7, so as to regulate the pressure in common rail 6 in optimum manner by means of bypass solenoid valves 14 or 14'. When shaft 23 of pump 7 is operated at a speed independent of that of drive shaft 4, on the other hand, the position and angular speed of shaft 23 are determined by a sensor and transmitted to control unit 16, so that the pressure in common rail 6 is also regulated, by means of bypass solenoid valves 14 or 14', in optimum manner as a function of the position and angular speed of shaft 23.

Control unit 16 may be designed to control bypass solenoid valves 14 or 14' by means of a known feedback control method at each compression stroke of pumping members 18 and as a function of the optimum pressure value of common rail 6.

The injection system described above obviously embodies a method of controlling the fuel pressure in a storage volume 6 for at least one fuel injector 5 of an internal combustion engine 2, wherein the fuel is supplied to storage volume 6 by at least one reciprocating pumping member 18 with a compression stroke; pumping member 18 having a bypass solenoid valve 14, 14'; the control method being characterized by comprising the steps of:

defining an optimum pressure value of the fuel in storage volume 6 as a function of operating conditions of engine 2;

operating bypass solenoid valve 14, 14' to generate multiple deliveries for a compression stroke of said pumping member 18; and controlling, possibly feedback controlling, the duration of each delivery, to keep the pressure of the fuel in storage volume 6 substantially constant during operation of injector 5.

The advantages, as compared with known systems, of the injection system according to the invention will be clear from the foregoing description. In particular, by virtue of the multiple fuel deliveries performed by each pumping member 18, common rail 6 may be made smaller, thus also simplifying layout of the injection system in the engine compartment.

Clearly, other changes and improvements may be made to the injection system as described herein without, however, departing from the scope of the accompanying claims. For example, high-pressure pump 7 may be defined by a pump with three or more radial pumping members, and may also be used in other than four-cylinder engines. Pump 7 may even comprise only one pumping member 18.

Figure 2:
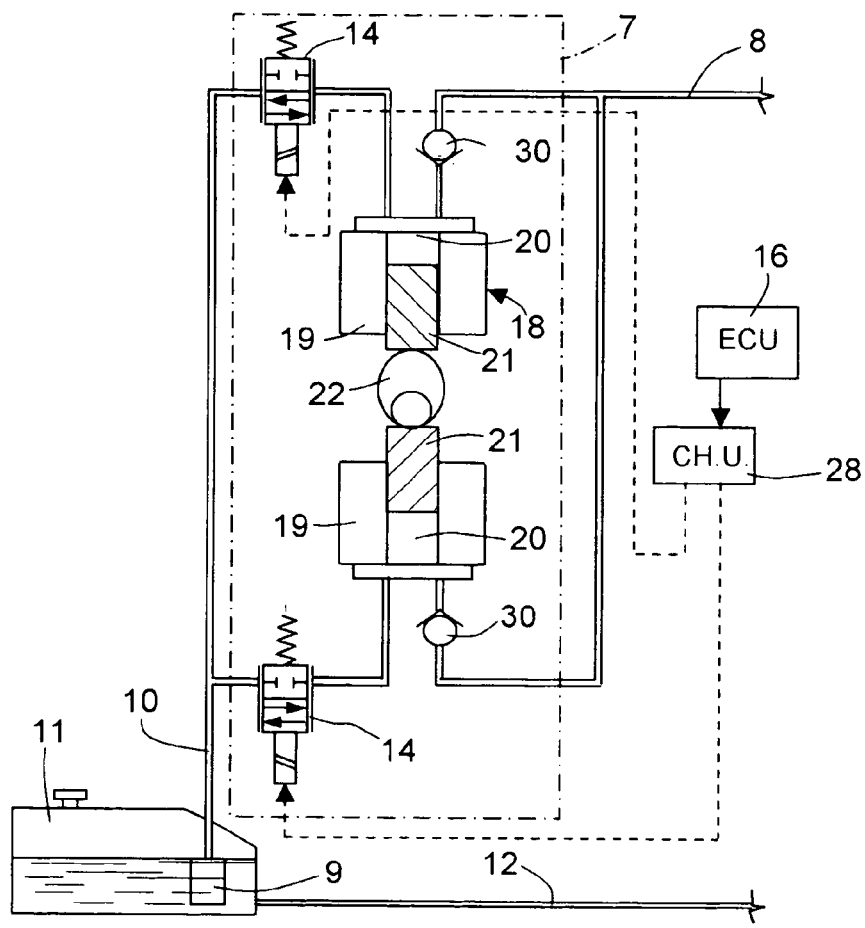
FIGS. 2 to 5 show details of corresponding embodiments of the fuel injection system according to the invention.

The FIG. 2 embodiment may comprise an intake valve between solenoid valve 14 and compression chamber or chambers 20. The two pumping members 18 in the FIG. 2 embodiment may be parallel, as in the FIGS. 3 and 5 embodiments. And, finally, chopper unit 28 may be designed to produce a different number of deliveries, and may be defined by an electronic or electric circuit separate from control unit 16.

The invention claimed is:

1. A storage-volume fuel injection system for an internal combustion engine having a number of cylinders; the system comprising
    a pump for supplying high-pressure fuel to a storage volume, and
    a number of injectors supplied by said storage volume to inject the high-pressure fuel into corresponding cylinders of the engine at a corresponding injection cycle; said pump comprising
    at least one reciprocating pumping member with a compression stroke, and
    control means for controlling the pressure of the fuel supplied by the pump to the storage volume;
    characterized in that said control means comprise at least one bypass solenoid valve controlled by a chopper unit to generate multiple deliveries for each compression stroke of said pumping member.

2. An injection system as claimed in claim 1, characterized in that said chopper unit controls said solenoid valve by pulse width modulation (PWM) as a function of operating conditions of the engine, so that each delivery of said pump is limited to a variable portion of said compression stroke.

3. An injection system as claimed in claim 2, characterized in that said chopper unit commands said pulse width modulation also as a function of the instantaneous position and speed of said pumping member at a frequency equal to the number of desired deliveries multiplied by the frequency of the compression strokes of said pumping member.

4. An injection system as claimed in claim 2, characterized in that said chopper unit commands at least one delivery for each injection cycle into the cylinders of the engine.

5. An injection system as claimed in claim 4, wherein said injection cycle comprises at least one main injection and a supplementary injection; characterized in that at least said delivery corresponding to each injection cycle is performed during at least said main injection.

6. An injection system as claimed in claim 1, wherein said pump comprises at least two pumping members, each having a compression chamber communicating with said storage volume by a delivery line; characterized in that each pumping member is integrated with a corresponding bypass solenoid valve located at the relative compression chamber.

7. An injection system as claimed in claim 6, characterized in that each of said bypass solenoid valves communicates with the compression chamber of the corresponding pumping member between a corresponding intake valve and a corresponding delivery valve.

8. An injection system as claimed in claim 6, characterized in that each of said bypass solenoid valves is located along an intake line, and communicates directly with the compression chamber of the relative pumping member.

9. An injection system as claimed in claim 1, wherein said pump comprises at least two pumping members, each having a compression chamber communicating with said storage volume by a delivery line; characterized in that said bypass solenoid valve is common to said pumping members and located along said delivery line.

10. An injection system as claimed in claim 9, characterized in that said delivery line also has a non-return valve.

11. An injection system as claimed in claim 6, characterized in that said pumping members are coaxial and opposite, and are activated by a common cam.

12. An injection system as claimed in claim 6, characterized in that said pumping members are parallel, and are activated by two coaxial cams.

13. An injection system as claimed in claim 1, characterized in that said pump is controlled by cam means operated by an ordinary drive shaft of the engine via a motion transmission device.

14. An injection system as claimed in claim 1, wherein said pump has a number of pumping members equal to half the number of the cylinders of the engine; characterized in that said pump is operated with a transmission ratio of 0.5 between the shaft of the pump and the drive shaft.

15. An injection system as claimed in claim 1, wherein the engine has four cylinders, and said pump has three pumping members; characterized in that said pump is operated with a transmission ratio of 0.75 between the shaft of the pump and the drive shaft.

16. An injection system as claimed in claim 13 for a four-stroke engine, wherein said motion transmission device operates at least an ordinary camshaft at a speed equal to half the speed of said drive shaft; characterized in that said pump comprises a number of pumping members equal to half the number of cylinders of the engine; said pumping members being operated by cams fitted to said camshaft.

17. An injection system as claimed in claim 1, characterized in that said pump is operated by cam means operated at a speed independent of that of the ordinary drive shaft; said bypass solenoid valve being controlled by said chopper unit under the control of a position sensor of said pumping member.

18. A high-pressure pump for feeding fuel to a storage volume for supplying a number of fuel injectors, said pump comprising
at least one reciprocating pumping member with a compression stroke;
and said pumping member having a compression chamber communicating with a delivery line;
characterized in that said pumping member is integrated with a corresponding bypass solenoid valve located at said compression chamber, said solenoid valve being controlled by a chopper unit to generate multiple deliveries at a compression stroke of said pumping member.

19. A high-pressure pump as claimed in claim 18, characterized in that said bypass solenoid valve is coaxial with said pumping member.

20. A high-pressure pump as claimed in claim 19, and comprising two alternately operated pumping members; characterized in that said pump is integrated with two bypass solenoid valves, each coaxial with a corresponding pumping member.

21. A high-pressure pump as claimed in claim 20, characterized in that said pumping members are coaxial and opposite, and are operated by a common cam.

22. A high-pressure pump as claimed in claim 20, characterized in that said pumping members are parallel, and are operated by two coaxial cams.

23. A high-pressure pump as claimed in claim 22, characterized in that said chopper unit controls said solenoid valve by pulse width modulation (PWM) as a function of operating conditions of the engine, so that each delivery of said pump is limited to a variable portion of said compression stroke.

24. A method of controlling the fuel pressure in a storage volume for at least one fuel injector of an internal combustion engine, wherein said fuel is supplied to said storage volume by at least one reciprocating pumping member with a compression stroke; said pumping member having a bypass solenoid valve; the method being characterized by comprising the steps of:
defining an optimum pressure value of the fuel in said storage volume as a function of operating conditions of the engine;
operating said bypass solenoid valve to generate multiple deliveries for a compression stroke of said pumping member; and
controlling the duration of each of said deliveries, to keep the pressure of the fuel in said storage volume substantially constant during operation of said injector.

25. An injection system as claimed in claim 14 for a four-stroke engine, wherein said motion transmission device operates at least an ordinary camshaft at a speed equal to half the speed of said drive shaft; characterized in that said pump comprises a number of pumping members equal to half the number of cylinders of the engine; said pumping members being operated by cams fitted to said camshaft.

26. An injection system as claimed in claim 15 for a four-stroke engine, wherein said motion transmission device operates at least an ordinary camshaft at a speed equal to half the speed of said drive shaft; characterized in that said pump comprises a number of pumping members equal to half the number of cylinders of the engine; said pumping members being operated by cams fitted to said camshaft.

27. An injection system as claimed in claim 3, characterized in that said chopper unit commands at least one delivery for each injection cycle into the cylinders of the engine.

* * * * *